(12) United States Patent
Obrador

(10) Patent No.: US 7,424,147 B2
(45) Date of Patent: Sep. 9, 2008

(54) METHOD AND SYSTEM FOR IMAGE BORDER COLOR SELECTION

(75) Inventor: Pere Obrador, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 663 days.

(21) Appl. No.: 11/127,277

(22) Filed: May 12, 2005

(65) Prior Publication Data

US 2006/0257023 A1    Nov. 16, 2006

(51) Int. Cl.
*G06K 9/00* (2006.01)
*G06K 9/20* (2006.01)
*G06K 9/34* (2006.01)
*G06K 9/36* (2006.01)
*H04N 1/46* (2006.01)

(52) U.S. Cl. .................. 382/162; 382/100; 382/164; 382/282; 358/538

(58) Field of Classification Search .............. 382/100, 382/162–165, 167, 171, 173, 282; 358/517, 358/538
See application file for complete search history.

(56) References Cited

U.S. PATENT DOCUMENTS

| | | | |
|---|---|---|---|
| 5,140,348 A * | 8/1992 | Jamzadeh et al. ........... 347/115 |
| 6,587,596 B1 * | 7/2003 | Haeberli ..................... 382/283 |
| 7,043,053 B1 * | 5/2006 | Patton et al. ................ 382/101 |
| 7,184,061 B2 * | 2/2007 | Rao ............................ 345/629 |
| 2003/0021468 A1 * | 1/2003 | Jia et al. ..................... 382/162 |
| 2004/0080670 A1 * | 4/2004 | Cheatle ...................... 348/441 |
| 2004/0119726 A1 * | 6/2004 | Li ............................... 345/629 |
| 2005/0069199 A1 * | 3/2005 | Lipsky et al. ............... 382/162 |

* cited by examiner

*Primary Examiner*—Yubin Hung

(57) ABSTRACT

An exemplary method for selecting a color of a border surrounding an image, includes segmenting the image into regions, selecting a region not containing any color that is present at an outer edge of the image in an amount exceeding a threshold value, and selecting a border color based on a color of the selected region. Another exemplary method includes segmenting the image into regions, selecting a region color not present at an outer edge of the image in an amount exceeding a threshold value, and selecting a border color based on the selected region color. An exemplary system includes a memory for storing the image, and a processor for segmenting the image into regions, selecting a region not containing any color that is present at an outer edge of the image in an amount exceeding a threshold value, and selecting a border color based on a color of the selected region.

26 Claims, 6 Drawing Sheets

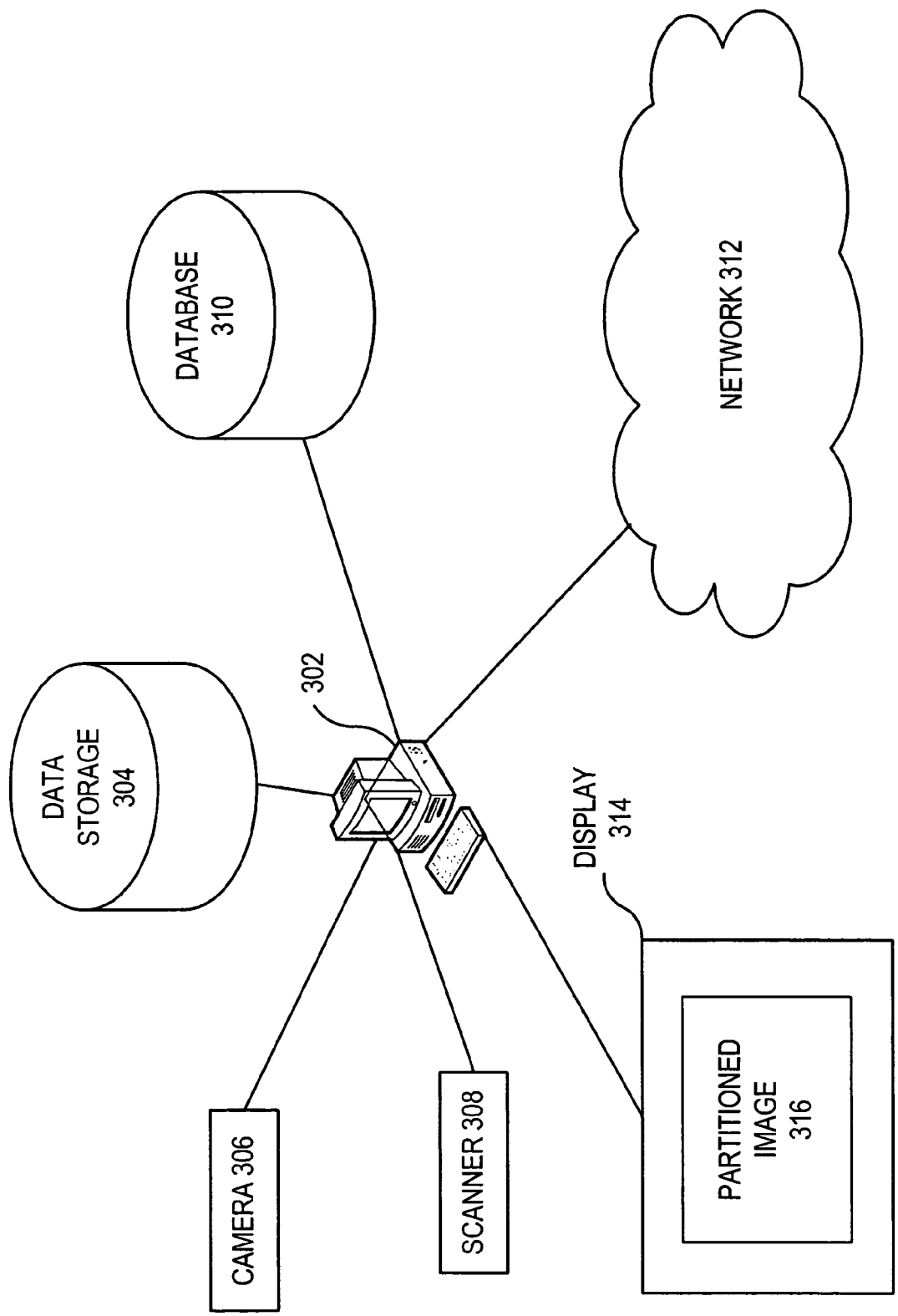

METHOD AND SYSTEM FOR IMAGE BORDER COLOR SELECTION

BACKGROUND INFORMATION

The color of a border or decorative matte around an image or picture can be manually selected by an artistically skilled person based on how the person feels the color of the matte matches or complements the image. Accordingly, what would be desirable is a technique for automatically selecting a border color.

SUMMARY

An exemplary method for selecting a color of a border surrounding an image, includes segmenting the image into regions, selecting a region not containing any color that is present at an outer edge of the image in an amount exceeding a threshold value, and selecting a border color based on a color of the selected region.

An exemplary method for selecting a color of a border surrounding an image, includes segmenting the image into regions, selecting a region color not present at an outer edge of the image in an amount exceeding a threshold value, and selecting a border color based on the selected region color.

An exemplary system for selecting a color of a border surrounding an image, includes a memory for storing the image, and a processor for segmenting the image into regions, selecting a region not containing any color that is present at an outer edge of the image in an amount exceeding a threshold value, and selecting a border color based on a color of the selected region.

BRIEF DESCRIPTION OF THE DRAWINGS

The accompanying drawings provide visual representations which will be used to more fully describe the representative embodiments disclosed herein and can be used by those skilled in the art to better understand them and their inherent advantages. In these drawings, like reference numerals identify corresponding elements
FIG. 3 illustrates an exemplary embodiment of a system.

DETAILED DESCRIPTION

Figure 1:
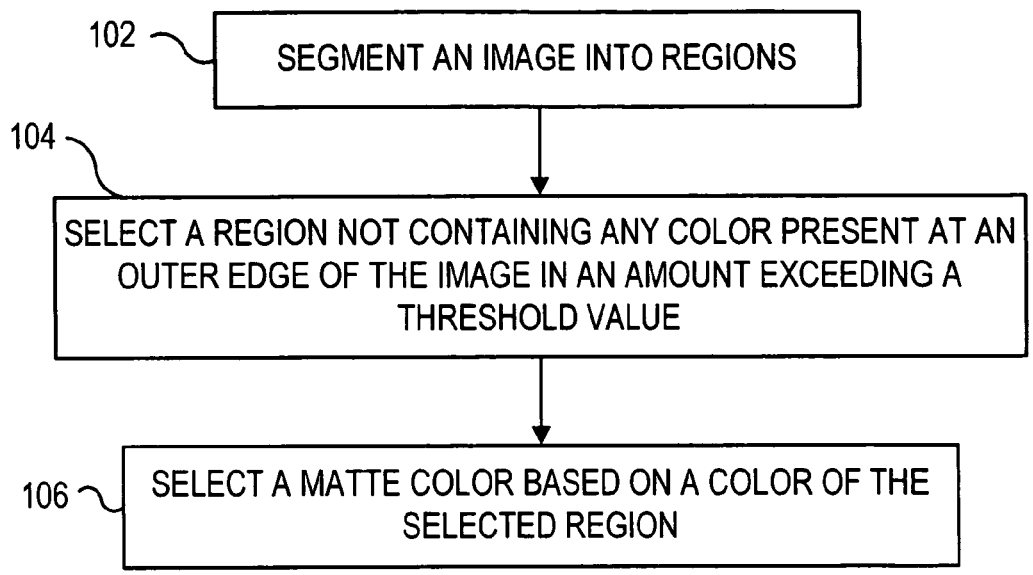
FIG. 1 illustrates an exemplary embodiment.

FIG. 1 illustrates an exemplary method for selecting the color of a matte or border surrounding an image or picture. In an exemplary embodiment, an objective is to select a border color that is different from all or most of an outer edge of the image, so that the image will not "wash into" the border.

As shown in FIG. 1, in a first block 102, the image is segmented into regions. The image can be in a digital format, for example represented by a plurality of pixels each have one or more numeric values indicating a color of each pixel, either originally or converted from an analog format. Each region can be represented by the color centroid of a color bin the region has been assigned to (in an exemplary embodiment, 25 different color bins are used). Alternatively the region color or color representing a region can be an average color of the pixels within the region. Other techniques or methods can be used to represent each region with a single color or set of colors, including representing the region with a set of all colors of pixels within the region, or a set of all colors of pixels within the region excluding colors whose number of pixels within the region is below a particular number or is less than a particular percentage of pixels in the region. From block 102 control proceeds to block 104, where a region not containing or not represented by any color that is present at an outer edge of the image in an amount exceeding a threshold, is selected. For example, the selected region can be a region which has been assigned a color centroid which is not present at an outer edge of the image. From block 104 control proceeds to block 106 where a matte or border color is selected based on a color of the selected region. Thus, an image such as a picture, painting or photograph can be analyzed and a color can be chosen automatically or with the aid of automated processing, for use in a matte or border to frame the image.

The border is a region that wholly or partially surrounds the image, and can extend any desired fixed or variable distance from an outer edge of the image. In an exemplary embodiment, the border is adjacent to all or part of the outer edge of the image. In another exemplary embodiment, the border touches all or part of the outer edge of the image. The border can be contiguous or non-contiguous, and can be formed by pixels each having the color selected for the border. Alternatively, the border can be formed by different color pixels, whose average or otherwise combined color is equal, or approximately equal, to a color selected for the border. The different color pixels can be evenly or non-evenly distributed across an area of the border, and the colors of the pixels can be evenly or non-evenly distributed across an area of the border. It should also be noted that an image can include multiple images or sub-images, and image or sub-image content can include but is not limited to graphics, natural scenes, artistic renderings, or text or any combination thereof.

Figure 2A:
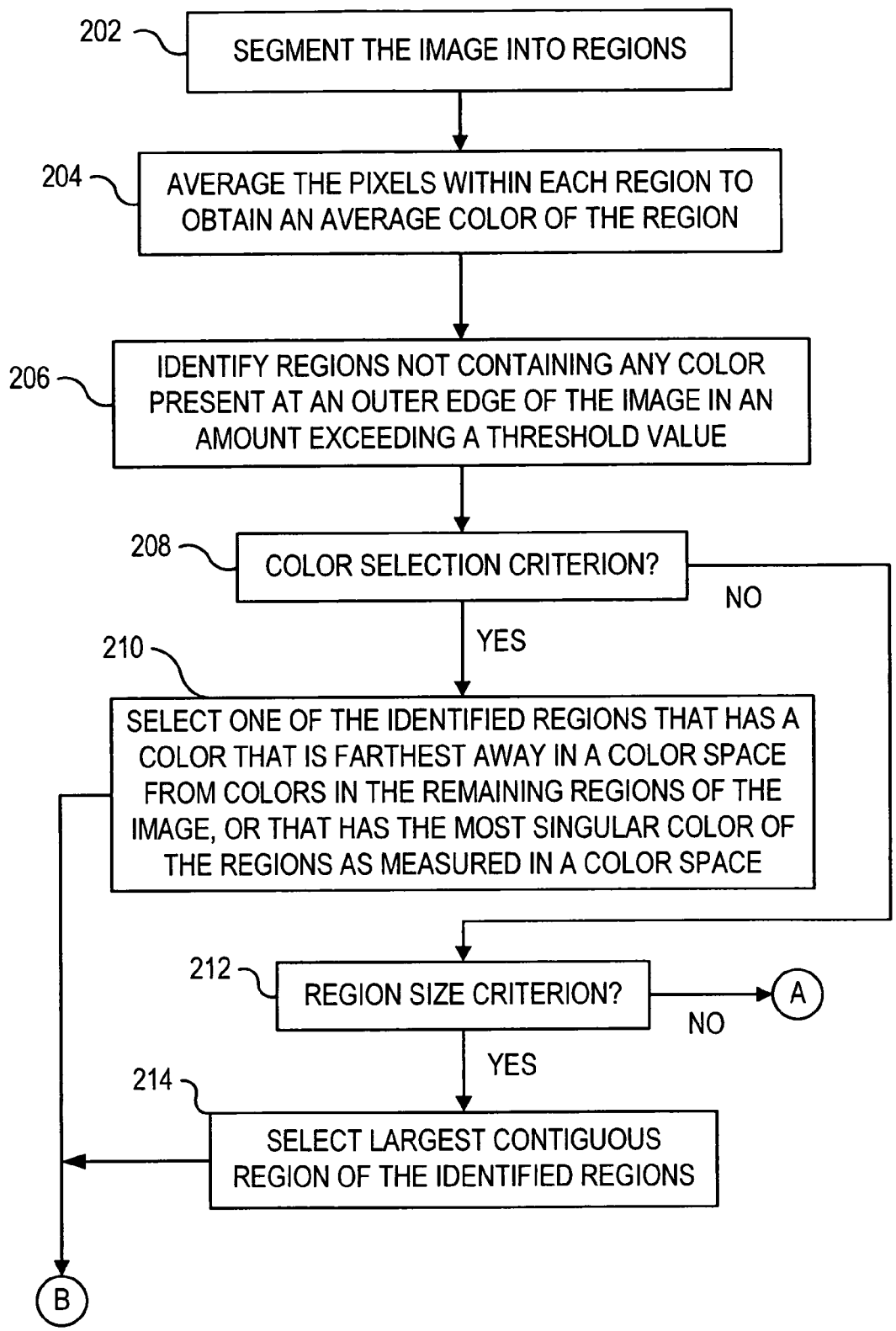
FIGS. 2A-2C illustrate an exemplary embodiment.
Figure 2B:
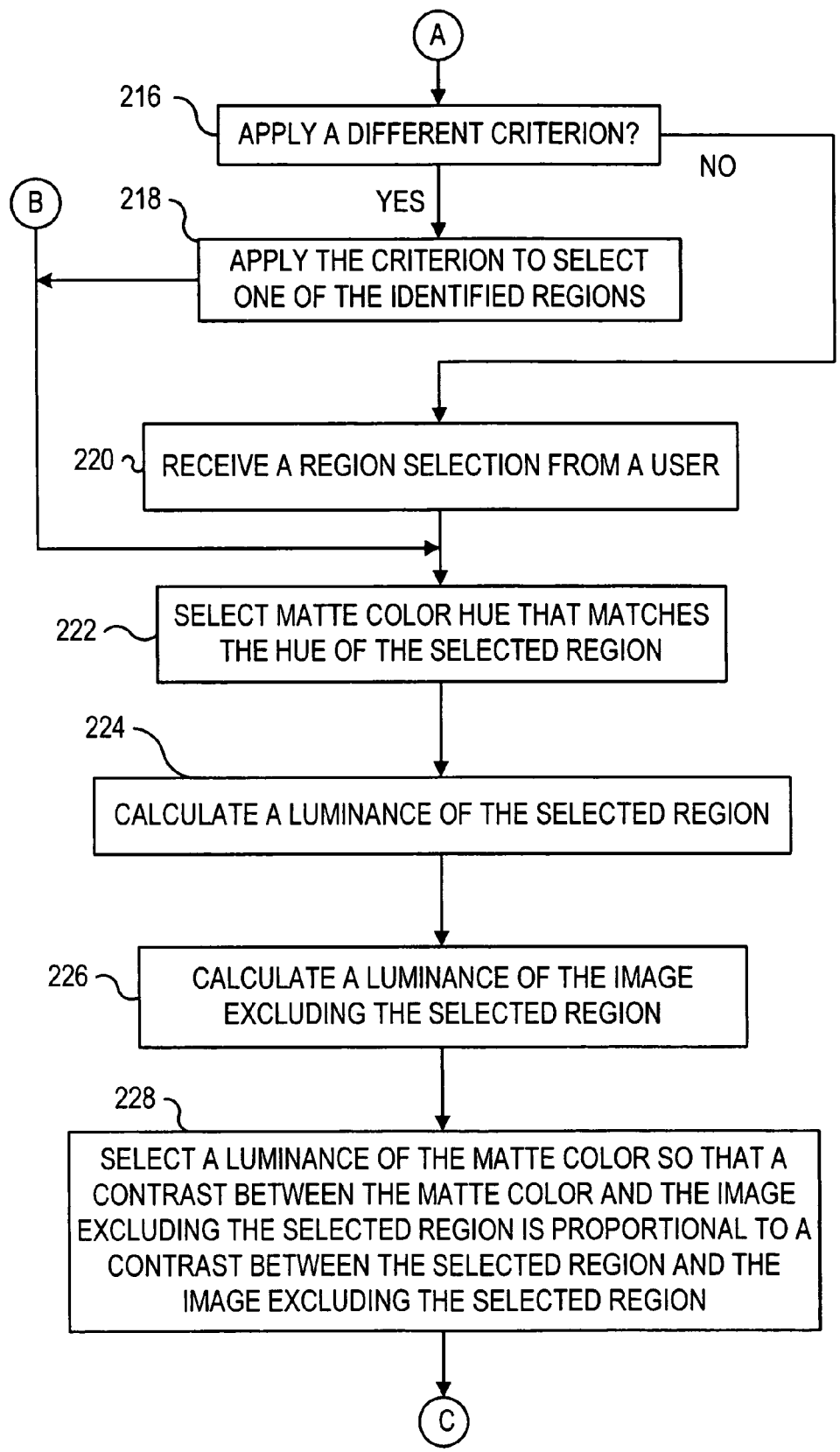
Figure 2C:
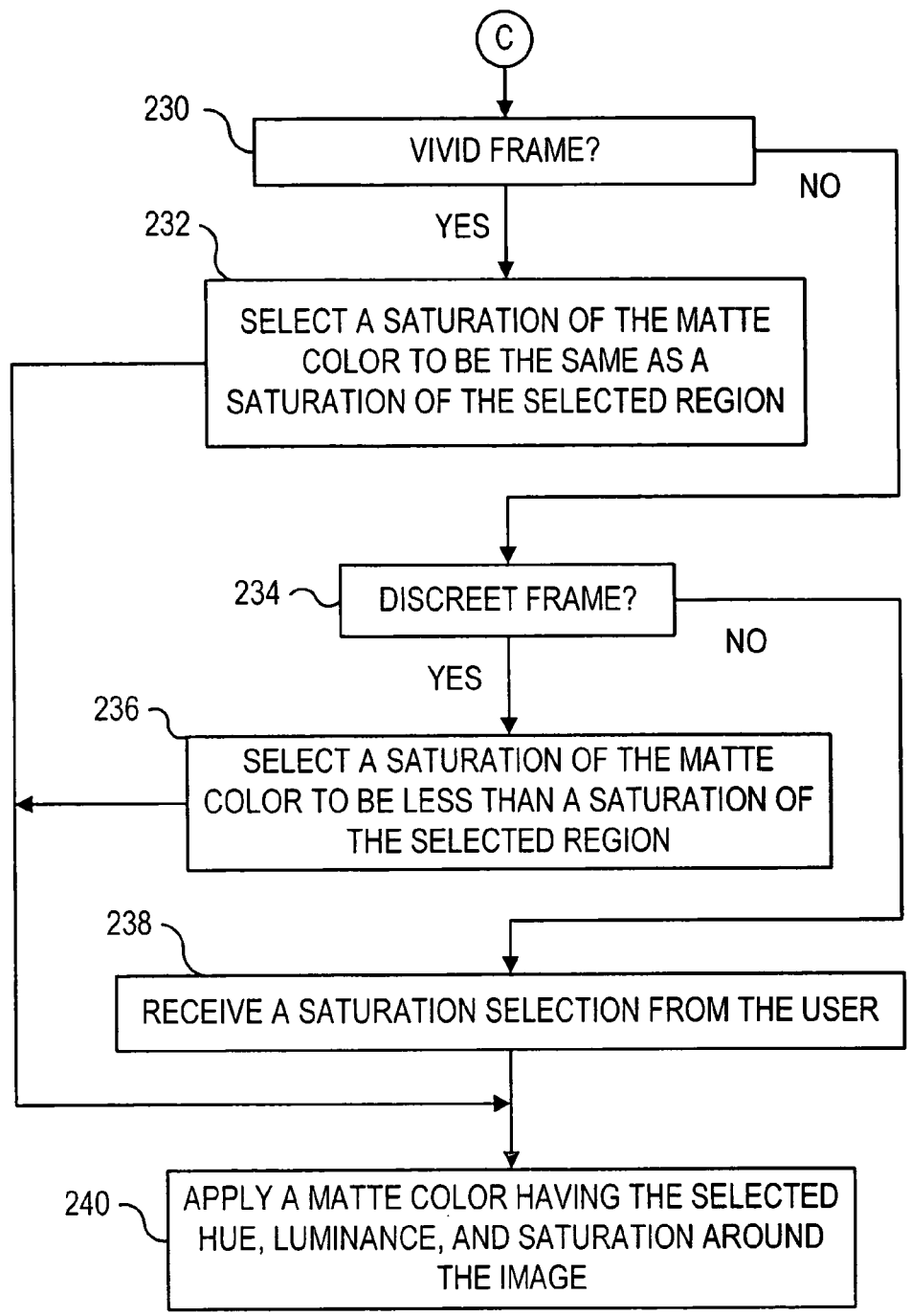

FIGS. 2A-2C illustrate an exemplary method containing more details. In a first block 202 the image is segmented into regions. In an exemplary embodiment, a segmentation algorithm is used that takes into account mainly color and not texture, for example, region growing based on color. Other segmentation algorithms can be used, including for example, segmentation algorithms known in the art. Any of the segmentation methods disclosed in the text "Digital Image Processing", authored by Rafael C. Gonzalez and Richard E. Woods, published 1992 by Addison Wesley Publishing Company, Inc. (which is hereby incorporated by reference) can be used.

From block 202, control proceeds to block 204, wherein the pixels within each region are averaged to obtain an average color of the region which is then used as a representative of the region. Other methods and techniques can be used to determine or select a representative color for each region. For example, the colors of a region can be binned, and then the color represented by the mode of the distribution (histogram) can be used to represent the region. The mode would be the bin that has the most pixels in it, and the color of the bin would be the centroid of the bin, or the average color of the pixels in the bin. Different bin sizes can be selected or used. From block 204, control proceeds to block 206.

In block 206, regions that do not contain any color that is present at an outer edge of the image in an amount exceeding a threshold value, are identified. This can ensure that the border has some contrast with the image, and allows a user to ensure that the border color does not, or does not substantially, diffuse into the image. The amount can be, for example, a percentage of the length of the outer edge of the image along which the color is present. In an exemplary embodiment, the threshold is zero so that the identified regions do not contain any color that is present at an outer edge of the image. Thus, in that situation, even if a region is not touching the border or outer edge of the image, and another region with the same color is, then that color may not be used for the border. The threshold value can, for example, be a percentage of the length of the outer edge along which a color is present, and can have any desired value, for example, a percentage ranging from 0 to 100. A user can be prompted to select or provide a threshold value, a default threshold value can be provided, and/or the threshold value can be automatically determined by analysis of the image. For example, if all colors, or all average colors represented in the regions, are present in one degree or another along the border or outer edge of the image, then the threshold value can be automated adjusted to be greater than or equal to the smallest or several of the smallest amounts of color that is present at the outer edge of the image. The threshold value can also be automatically adjusted and/or adjusted with input from a user, to combine or integrate various ones of these factors. In another exemplary embodiment, the color having the smallest presence along the edge of the image is selected.

From block 206, control proceeds to block 208 for a determination is made whether color is to be used as a basis for selecting one of the identifying regions. This decision can, for example, be made by one or more of: prompting a user to choose a selection criterion; a predetermined default value or setting; a predetermined default value or setting; and/or automated analysis of the image. For example, color can be automatically chosen as a basis for selecting one of the identifying regions, if an average distance in color space between colors of the regions exceeds (or does not exceed) a threshold. Other measures can be used as criterion for choosing color as a basis for selecting one of the identifying regions.

If the decision in block 208 is no, then control proceeds from block 208 to block 212. If the determination in block 208 is yes, then control proceeds from 208 to block 210, where one of the identified regions that has a color that is farthest away in a color space (for example, in Y U V, L A B, Y C C, or H S V color space, etc.) from colors in the remaining regions of the image or that has the most singular color of the regions as measured in a color space, is selected. From block 210, control proceeds to block 222.

In block 212, to which control proceeds if the decision in block 208 was negative, a determination is made whether region size is to be a basis for selecting one of the identifying regions. If no, then control proceeds from block 212 to block 216. If yes, then control proceeds from block 212 to block 214, where a largest contiguous one of the identifying regions is selected. From block 214, control proceeds to block 222.

In block 216, to which control proceeded after a negative determination in block 212, a determination is made whether a different criterion is to be applied to select one of the identifying regions. If no, then control proceeds to block 220, if yes, then control proceeds from block 216 to block 218, where the different criterion is applied to select one of the identifying regions. The different criterion can be, for example, selected or provided by a user. From block 218, control proceeds to block 222.

In block 220, to which control proceeded after a negative determination in block 216, a region selection is received from a user. Thus, the user can manually select a region that will then be used to select a color hue for the border. Those skilled in the art will recognize that the blocks 208-220 can be variously intermixed or combined, or used in part or in whole in various embodiments. For example, a user can be given an opportunity to select which criterion will be applied to select one of the identifying regions. From block 220, control proceeds to block 222.

In block 222, a hue for the border color is selected based on the hue of the selected region. For example, the border color of hue can be selected to match the hue of the selected region. From block 222, control proceeds to block 224.

Figure 4:
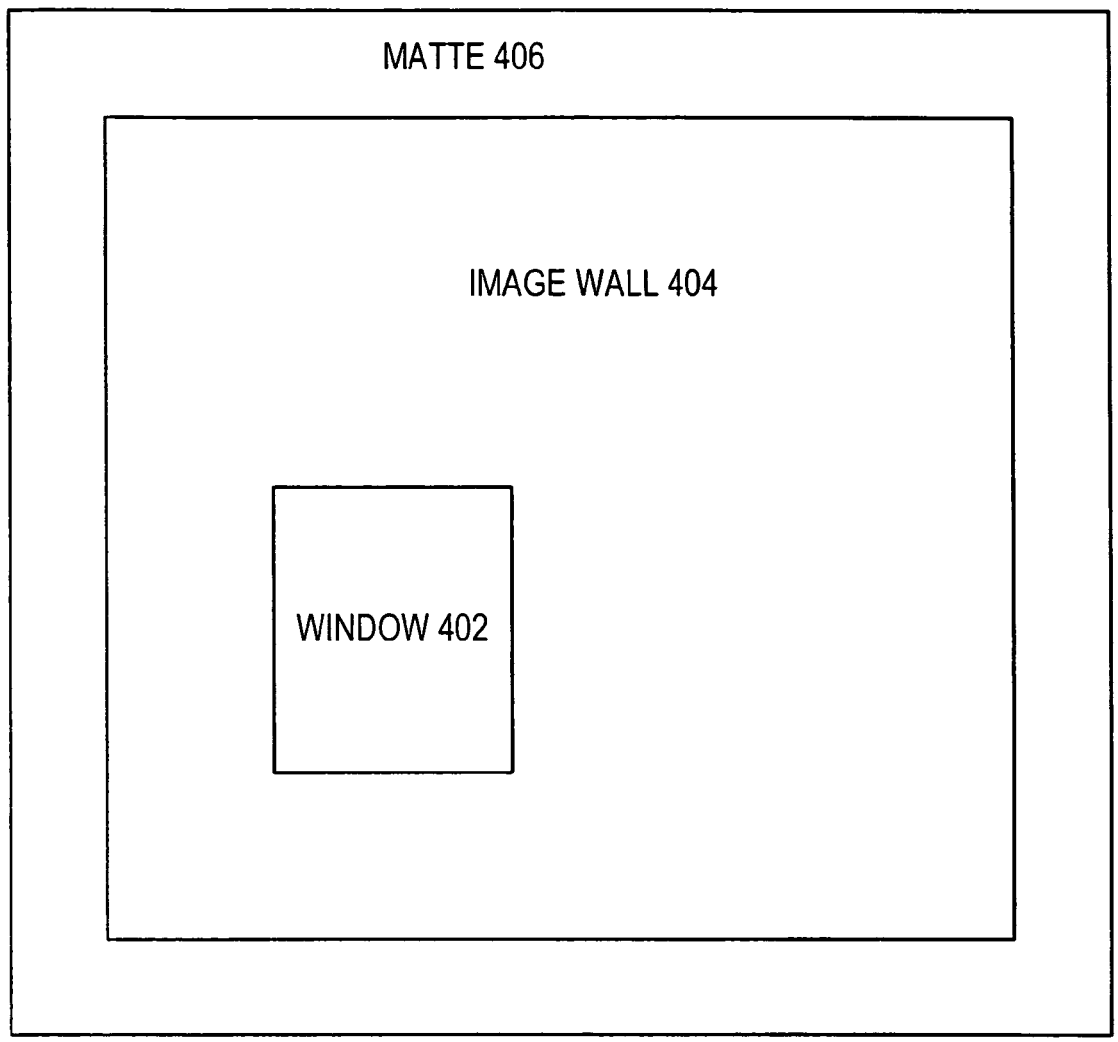
FIG. 4 illustrates an exemplary border and image.

In block 224, a luminescence of the selected region is calculated. From block 224, control proceeds to block 226, wherein a luminescence of the image excluding the selected region is calculated. This can be visualized with respective FIG. 4, which shows a window 402 (i.e., the selected region) surrounded by the remaining portion of the image (i.e., the image wall 404 that forms the remainder of the image, excluding the selected region). As shown in FIG. 4, the matte or border 406 will ultimately form a border or frame around the image, where the image includes both the image wall 404 and a window or selected region 402.

From block 226, control proceeds to block 228 where a luminescence of the border color is selected so that a contrast between the border color and the image excluding the selected region (i.e., the image wall 404) is proportionally to a contrast between the selected region (i.e., the window 402) and the remainder of the image (i.e., the image wall 404). From block 228, control proceeds to block 230.

In block 230, a determination is made as to whether a vivid frame is to be used. This determination can be made for example, by prompting a user to select among options and/or directly provide a saturation value. If the determination in block 230 is negative, then control proceeds to block 234. If the determination is positive, then control proceeds from block 230 to block 232 where a saturation of the border color is selected to be same as a saturation of the selected region (i.e., the window 402). From block 232, control proceeds to block 240.

In block 234, to which control proceeded after a negative determination in block 230, a determination is made whether a discreet frame is used. If no, then control proceeds to block 238. If yes, then control proceeds from block 234 to block 236, where a saturation over the border color is selected to be less than the saturation of the selected region, for example by a predetermined factor. In an exemplary embodiment, the new chroma is generated as: $c1'=2*c1/3$ and $c2'=2*c2/3$. From block 236, control proceeds to block 240.

In block 238, to which control proceeded from a negative determination in block 234, a saturation selection is received from the user. From block 238, control proceeds to block 240 where a border color having the selected hue, luminescence and saturation is applied around the image. The width of the border or a distance from an outer edge of the image to the outer edge of the border can be a predetermined value, can be a predetermined percentage of a distance across the image, and/or can be selected by or received from the user.

Although the terms hue, luminescence and saturation have been used to describe exemplary methods, those skilled in the art will recognize that other dimensions or characteristics that define color can additionally or alternatively be used, for example, based on a particular color space that is being used to implement an exemplary method or system consistent with the principles and techniques disclosed herein. Any color space can be used.

FIG. 3 illustrates an exemplary system that can be used to implement the methods of FIG. 1 and FIG. 2. In particular, FIG. 3 illustrates a computer 302 is connected variously to a network 312, a database 310, data storage facility 304 (e.g., a hard disk drive), a camera 306, and a scanner 308. For example, a memory of the computer 302 and/or the data storage 304, and database 310 can store the image, and a processor of the computer 302 can segment the image into regions, select a region not containing any color that is present at an outer edge of the image in an amount exceeding a threshold value, and select a border color based on a color of the selected region. The processor can also identify regions not containing any color that is present at an outer edge of the image in an amount exceeding a threshold value, and select one of the identified regions as a basis for selecting the border color. The display 314 can display the image and a border having the selected color, and an interface, such as a keyboard of the computer 302 or any other interface (e.g. the camera 306, scanner 308, a device of the computer 302 for receiving data storage media such as a removable flash card or key, floppy disk, CD (Compact Disk) drive, etc.), can receive input from a user. The computer 302 can receive an image from any of the elements 304-312 for analysis. Software implementing the methods of FIGS. 1 and 2 can be run in part or in whole, on the computer 302. A user can respond to prompts, input selections, and view interim and final results of the method (including for example the elements shown in FIG. 4), for example via the display 314. For example, the display 314 can show a 316 partitioned or segmented into sections, as described herein. Via one or more user interfaces of the computer 302, for example, a keyboard, mouse and display screen, the user can also provide information to the computer 302 and/or make selections. For example, the user can provide or select images to be processed, via any peripheral devices or data ports of the computer 302, including for example, cable connections or data ports and data storage media such as floppy disks or optical disks to internal floppy or optical drives of the computer 302.

Software packages, elements or modules for variously providing the functions described herein, can be implemented on a computer. These software processes running on the computer can additionally or alternatively be implemented in a distributed fashion external to the network using for example distributed computing resources, and/or can be implemented using resources of the network.

The methods, logics, techniques and pseudocode sequences described herein can be implemented in a variety of programming styles (for example Structured Programming, Object-Oriented Programming, and so forth) and in a variety of different programming languages (for example Java, C, C++, C#, Pascal, Ada, and so forth). In addition, those skilled in the art will appreciate that the elements and methods or processes described herein can be implemented using a microprocessor, computer, or any other computing device, and can be implemented in hardware and/or software, in a single physical location or in distributed fashion among various locations or host computing platforms. Agents can be implemented in hardware and/or software or computer program(s) at any desired or appropriate location. Those skilled in the art will also appreciate that software or computer program(s) can be stored on a machine-readable medium, wherein the software or computer program(s) includes instructions for causing a computing device such as a computer, computer system, microprocessor, or other computing device, to perform the methods or processes.

A machine readable medium can include software or a computer program or programs for causing a computing device to perform the methods and/or techniques described herein.

It will also be appreciated by those skilled in the art that the present invention can be embodied in other specific forms without departing from the spirit or essential characteristics thereof, and that the invention is not limited to the specific embodiments described herein. The presently disclosed embodiments are therefore considered in all respects to be illustrative and not restrictive. The scope of the invention is indicated by the appended claims rather than the foregoing description, and all changes that come within the meaning and range and equivalents thereof are intended to be embraced therein. The term "comprising" as used herein is open-ended and not exclusive.

The invention claimed is:

1. A method for selecting a color of a border surrounding an image, comprising:
    segmenting the image into regions;
    selecting a region not containing any color that is present at an outer edge of the image in an amount exceeding a threshold value; and
    selecting the border color based on a representative color of the selected region.

2. The method of claim 1, comprising:
    identifying regions not containing any color that is present at an outer edge of the image in an amount exceeding a threshold value; and
    selecting one of the identified regions as a basis for selecting the border color.

3. The method of claim 1, comprising identifying a single color for each region, wherein the colors present at the outer edge of the image consist of the identified colors of regions touching the outer edge of the image.

4. The method of claim 3, wherein the representative color of a region is the average color of pixels in the region.

5. The method of claim 3, wherein the representative color of a region is the mode of a color distribution within the region.

6. The method of claim 2, wherein the identified regions do not contain any color that is present at the outer edge of the image.

7. The method of claim 1, wherein the amount is a percentage of the length of the outer edge along which the color is present.

8. The method of claim 2, wherein each region is contiguous.

9. The method of claim 8, wherein the selected region is the identified region that has a color that is farthest away in a color space from colors in the remaining regions of the image.

10. The method of claim 8, wherein the selected region has the most singular color among the identified regions as measured in YCC space or LAB space.

11. The method of claim 8, wherein the selected region is the largest contiguous region of the identified regions.

12. The method of claim 1, wherein the border color is selected based on a representative hue of the selected region, a representative contrast between the selected region and regions adjacent to the selected region, and a representive saturation of the selected region.

13. The method of claim 12, wherein the representative hue and the representative saturation of the selected region are a hue and a saturation of an average color of the selected region.

14. The method of claim 12, comprising selecting a border color hue that matches the representative hue of the selected region.

15. The method of claim 12, comprising:
    calculating an average luminance of the selected region;
    calculating an average luminance of the image excluding the selected region;
    selecting a luminance of the border color so that a contrast between the border color and the image excluding the selected region is proportional to a contrast between the selected region and the image excluding the selected region.

16. The method of 15, wherein the contrast between the border color and the image excluding the selected region is equal to the contrast between the selected region and the image excluding the selected region.

17. The method of claim 12, wherein a saturation of the border color is equal to or greater than a saturation of the selected region.

18. The method of claim 12, wherein a saturation of the border color is less than a saturation of the selected region.

19. A method for selecting a color of a border surrounding an image, comprising:
   segmenting the image into regions;
   selecting a region color not present at an outer edge of the image in an amount exceeding a threshold value; and
   selecting a border color based on the selected region color.

20. The method of claim 19, comprising:
   identifying regions not containing any color that is present at an outer edge of the image in an amount exceeding a threshold value; and
   selecting one of the identified regions as a basis for selecting the border color, wherein the region color of a region is an average color of pixels in the region or a mode of a color distribution within the region.

21. A system for selecting a color of a border surrounding an image, comprising:
   a memory for storing the image;
   a processor for segmenting the image into regions, selecting a region not containing any color that is present at an outer edge of the image in an amount exceeding a threshold value, and selecting a border color based on a color of the selected region.

22. The system of claim 21, wherein the processor identifies regions not containing any color that is present at an outer edge of the image in an amount exceeding a threshold value, and selects one of the identified regions as a basis for selecting the border color.

23. The system of claim 22, comprising:
   a display for displaying the image and a border having the selected color; and
   an interface for receiving input from a user; and
   wherein the processor selects the border color based on a hue of the selected region, a contrast between the selected region and regions adjacent to the selected region, and a saturation of the selected region.

24. A computer readable medium encoded with a computer program for causing a computer to perform a method comprising:
   segmenting an image into regions;
   selecting a region not containing any color that is present at an outer edge of the image in an amount exceeding a threshold value; and
   selecting a border color based on a color of the selected region.

25. The medium of claim 24, wherein the computer program causes the computer to further perform:
   identifying regions not containing any color that is present at an outer edge of the image in an amount exceeding a threshold value; and
   selecting one of the identified regions as a basis for selecting the border color.

26. The medium of claim 25, wherein the computer program causes the computer to further perform:
   selecting the border color based on a hue of the selected region, a contrast between the selected region and regions adjacent to the selected region, and a saturation of the selected region.

* * * * *

UNITED STATES PATENT AND TRADEMARK OFFICE
CERTIFICATE OF CORRECTION

PATENT NO. : 7,424,147 B2
APPLICATION NO. : 11/127277
DATED : September 9, 2008
INVENTOR(S) : Pere Obrador Page 1 of 1

It is certified that error appears in the above-identified patent and that said Letters Patent is hereby corrected as shown below:

In column 6, line 47, in Claim 12, delete "representive" and insert -- representative --, therefor.

In column 6, line 48, in Claim 12, delete "representive" and insert -- representative --, therefor.

In column 6, line 49, in Claim 12, delete "representive" and insert -- representative --, therefor.

Signed and Sealed this

Twenty-seventh Day of January, 2009

JOHN DOLL
*Acting Director of the United States Patent and Trademark Office*